United States Patent [19]

Szombathy

[11] Patent Number: 5,094,392

[45] Date of Patent: Mar. 10, 1992

[54] MACHINE FOR SHREDDING VEHICLE TIRES AND OTHER ARTICLES

[76] Inventor: Janos J. Szombathy, 920 C-6 Ridge, Lombard, Ill. 60148

[21] Appl. No.: 697,078

[22] Filed: May 8, 1991

Related U.S. Application Data

[63] Continuation-in-part of Ser. No. 525,470, May 18, 1990, which is a continuation-in-part of Ser. No. 394,621, Aug. 16, 1989, abandoned.

[51] Int. Cl.⁵ ............................................. B02C 13/20
[52] U.S. Cl. .................................. 241/167; 241/243; 241/235
[58] Field of Search ............... 241/166, 167, 242, 243, 241/DIG. 31, 236, 235

[56] References Cited

U.S. PATENT DOCUMENTS 3,931,935  1/1976  Holman .
4,059,236  11/1977 Brewer .
4,176,800  12/1979 Brewer .
4,394,983  7/1983  Ulsky .
4,629,134  12/1986 Pennekamp .
4,691,871  9/1987  Mochizuki .

FOREIGN PATENT DOCUMENTS 171064  4/1952  Austria .
929111  12/1947 France .

Primary Examiner—Timothy V. Eley
Attorney, Agent, or Firm—Lee, Mann, Smith, McWilliams & Sweeney

[57] ABSTRACT

A shredding machine for shredding vehicle tires and various other materials includes a pair of rotatable shafts and a cutting block mounted within a frame. The cutting block includes a top surface and a plurality of slots extending downwardly from the top surface and located on each side of the cutting block. The top surface of the block and each of the slots define respective U-shaped cutting edges. The shafts are rotatably mounted on the frame on opposite sides of the cutting block. Each shaft includes a plurality of cutting teeth which are spirally arranged along the length of each shaft. Each shaft may include one or more spirals of cutting teeth. The shafts are rotated in opposite directions relative to one another with one or more of the cutting teeth on each shaft being rotated through a respective slot in cutting engagement with the U-shaped cutting edge of the slot. The cutting teeth and the U-shaped cutting edges coact to shred material which is fed into the shredding machine into uniformly sized pellets. A stationary cleaning bar is mounted on the frame adjacent to each respective shaft for removing any shredded material which may cling to the cutting teeth.

15 Claims, 5 Drawing Sheets

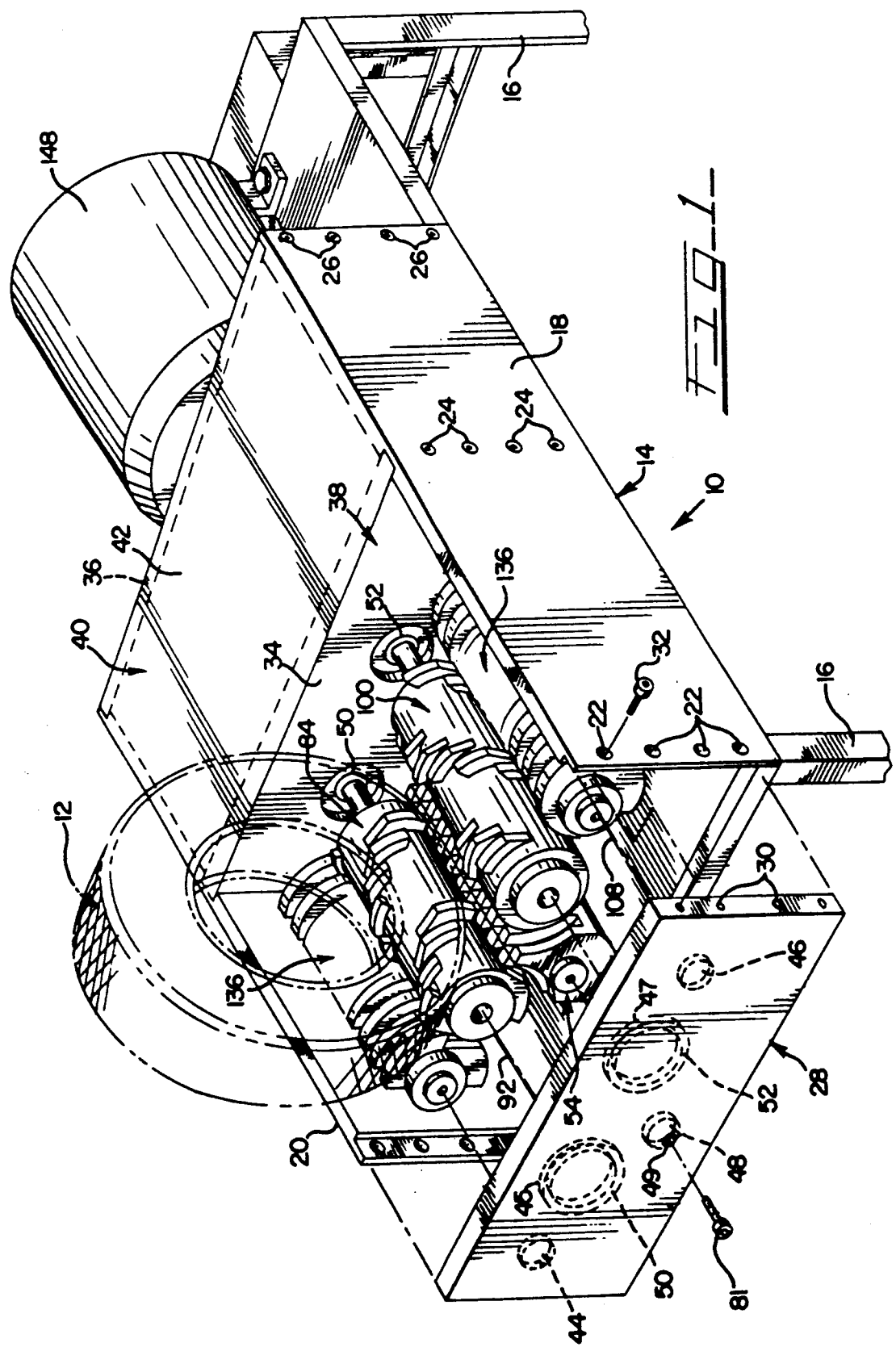

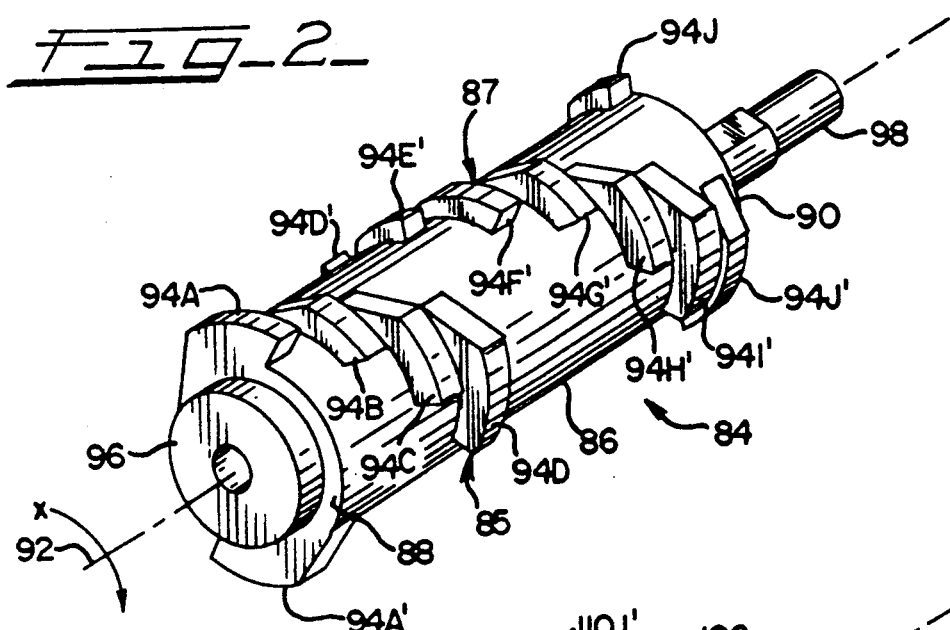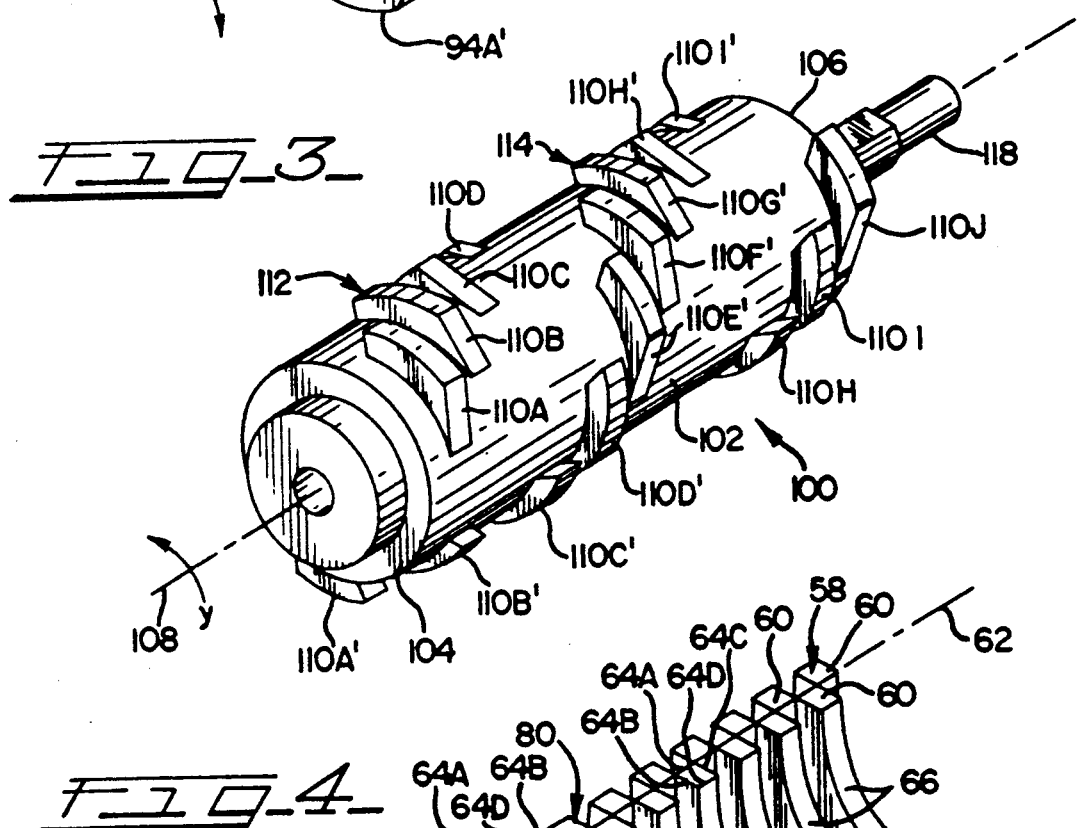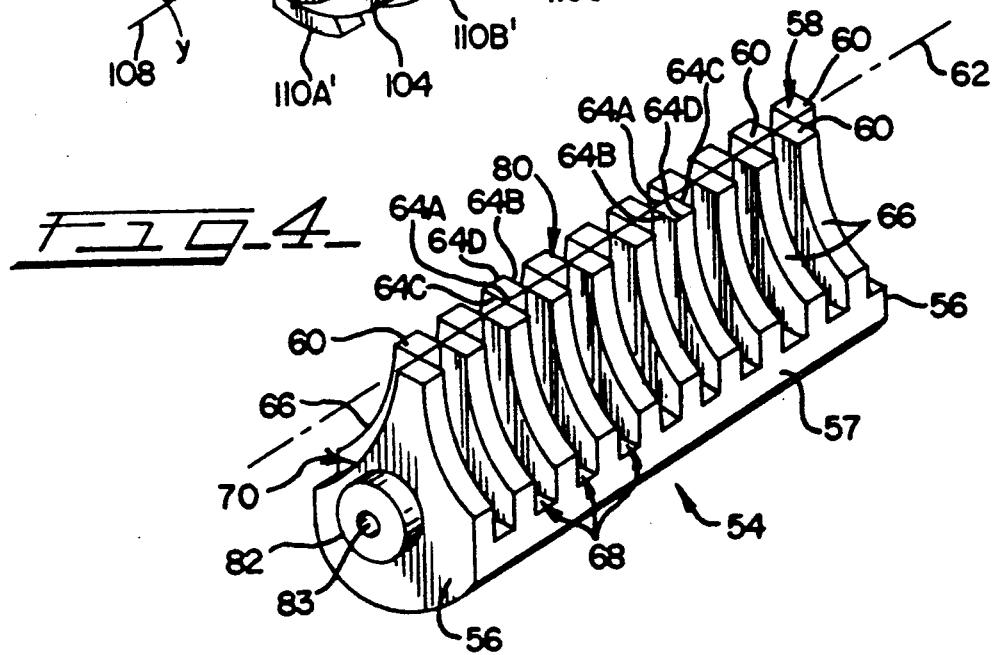

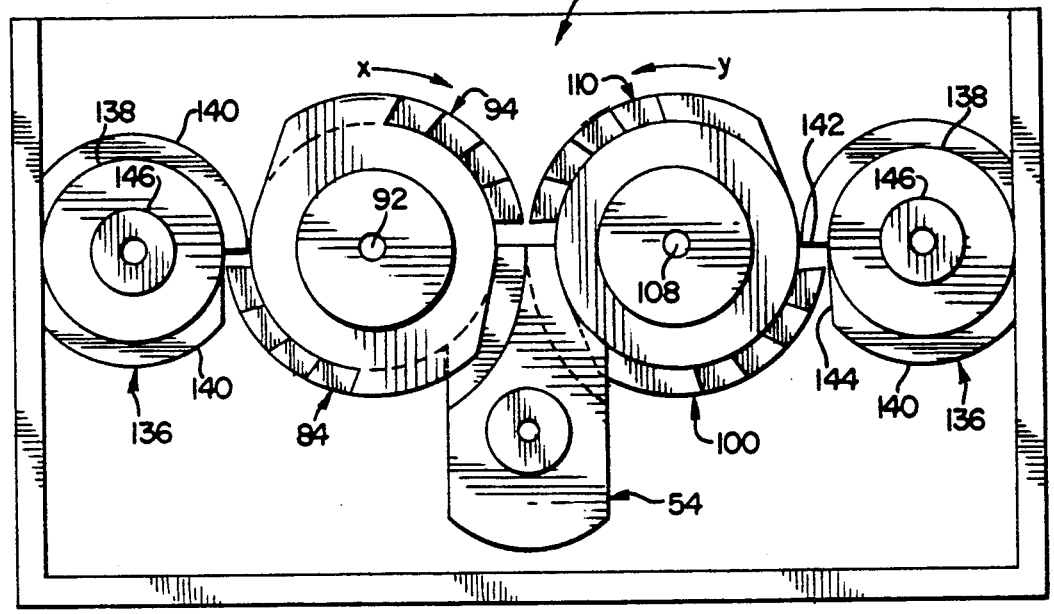
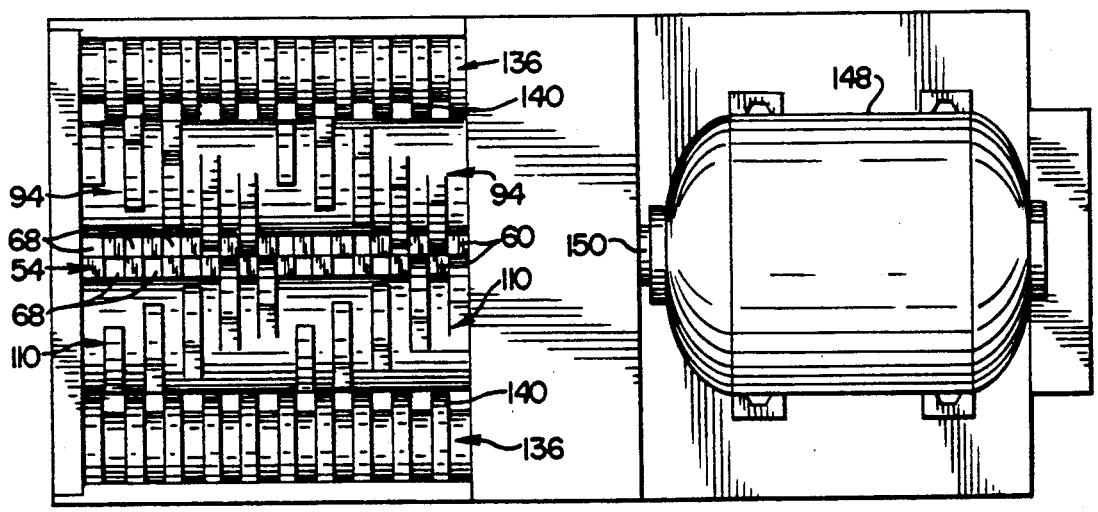

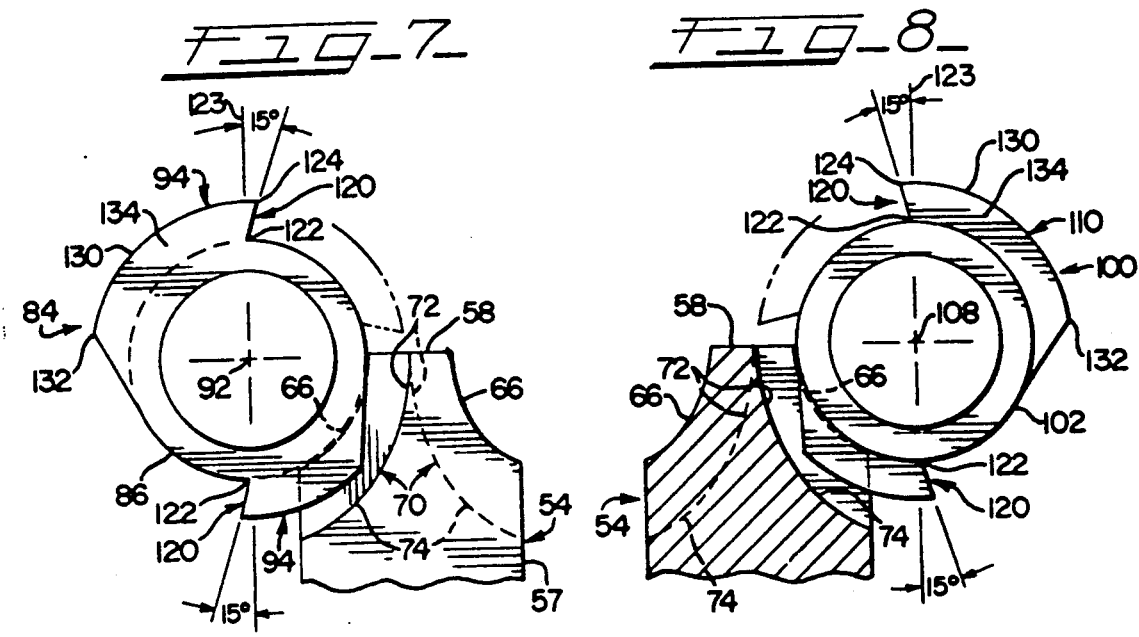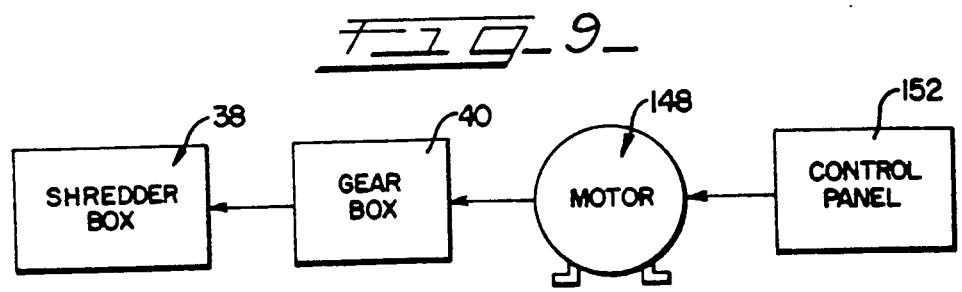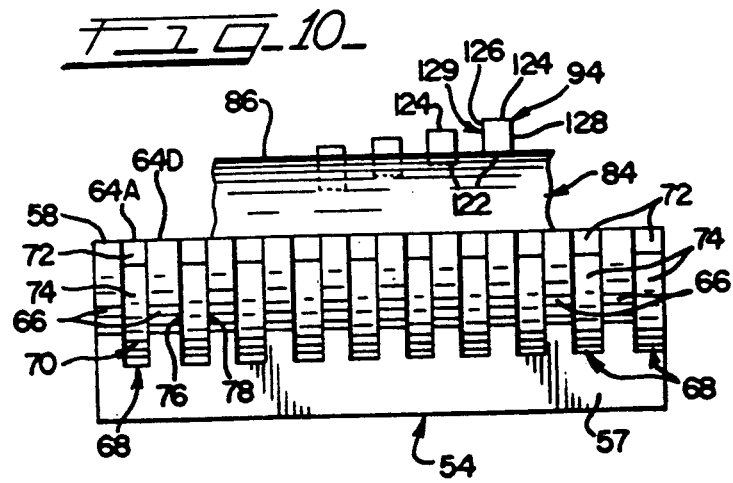

5,094,392

MACHINE FOR SHREDDING VEHICLE TIRES AND OTHER ARTICLES

RELATED APPLICATIONS

This application is a continuation-in-part of U.S. patent application Ser. No. 525,470, filed May 18, 1990, which is a continuation-in-part of U.S. patent application Ser. No. 394,621, filed Aug. 16, 1989, now abandoned.

BACKGROUND OF THE INVENTION

The present invention relates to machines for shredding or cutting vehicle tires and various other types of materials. Such shredding machines have been utilized in shredding waste materials which are to be disposed.

Disposal of waste materials is becoming increasingly more difficult and expensive. Waste disposal sites throughout the United States are quickly becoming filled to capacity, and the lack of adequate waste disposal capacity is reaching crisis proportions. Many states must ship their waste materials to other states for disposal and some states have banned certain materials from being dumped in their remaining landfill sites. As the remaining capacity of waste disposal sites decreases, the cost of disposing of waste materials will continue to become more expensive. The cost of shipping waste materials is also expensive and increases the total cost of waste disposal.

It has therefore been found desirable to dispose of waste materials in a volume efficient manner. Shredding of waste materials, especially bulky materials, into small pieces or pellets allows the pellets to be densely packed together into a significantly smaller volume than that occupied by the unshredded material. The shredded material will then occupy a smaller portion of the remaining disposal site space and will require a fewer number of truck loads to haul the shredded material to the disposal site.

Certain types of waste, such as vehicle tires, are extremely difficult and expensive to dispose of. Large unsightly tire dumps have arisen which store tires above ground as there is no economically feasible method of disposing of tires. Vehicle tires however may be changed from a commodity which is difficult and expensive to dispose of, to a commodity with a commercial value. Rather than disposing of tires in a dump, these tires may be shredded into pellets which may be utilized as a fuel source by utility companies. The shredded tire pellets however must be uniformly sized and of a sufficiently small size to be useable as a fuel. A shredded tire will occupy approximately one-sixth or one-seventh the volume of an unshredded tire. Therefore, six truck loads of unshredded tires may be transported as one truck load of shredded tires. Machines which have been used to reduce the volume of materials are shown in U.S. Pat. Nos. 3,931,935 and 4,691,871. These machines do not cut tires into uniformly sized small pellets which are capable of being sold and utilized as a fuel source.

SUMMARY OF THE INVENTION

A shredding machine is provided for shredding or comminuting vehicle tires and various other materials into uniformly sized small pellets. The shredding machine includes a cutting block and two rotating shafts mounted within a frame. The cutting block includes a top surface and a plurality of slots which extend downwardly from the top surface on each side of the cutting block. The top surface and each of the slots define a respective U-shaped cutting edge. The shafts are rotatably mounted on opposite sides of the cutting block. Each shaft includes a plurality of cutting teeth which are arranged in a spiral configuration along the length of each shaft. Each shaft may include one or more spirals of cutting teeth. Each cutting tooth includes a tooth face which is angled inwardly from a radius of the shaft. The edges of each cutting face define a second U-shaped cutting edge on each tooth. Each slot includes a downwardly and outwardly extending backwall which forms a relief with the slot's corresponding cutting teeth. The cutting block may also include concave surfaces located between adjacent slots which form reliefs with the cutting shafts.

Each shaft is rotated within the frame in opposite directions relative to one another. One or more cutting teeth are rotated through each respective slot in the cutting block with the U-shaped cutting edge on each cutting tooth being in cutting engagement with the U-shaped cutting edge of a slot. A cleaning bar is provided adjacent each shaft for removing any shredded material which may continue to cling to a cutting tooth.

Each shaft and its respective cutting teeth, and the cutting block, are respectively machined from a single solid piece of metal to provide strength and a long lasting precision fit between the shafts and their cutting teeth and the cutting block. Each of the cutting teeth may be resharpened without disassembling the shredding machine. The cutting edges in each of the slots in the cutting block may also be resharpened.

DESCRIPTION OF THE DRAWINGS

FIG. 1 is a perspective view of a first embodiment of the shredding machine shown in connection with a vehicle tire.

FIG. 2 is a perspective view of the first shaft having two sets of spirally arranged cutting teeth.

FIG. 3 is a perspective view of the second shaft having two sets of spirally arranged cutting teeth.

FIG. 4 is a perspective view of the cutting block.

FIG. 5 is a front elevational view of the shredding machine with the front panel removed.

FIG. 6 is a top plan view of the shredding machine.

FIG. 7 is a partial cross sectional view of the first shaft and of the cutting block.

FIG. 8 is a partial cross sectional view of the second shaft and of the cutting block.

FIG. 9 is a schematic diagram showing the operation of the shredding machine.

FIG. 10 is a side elevational view of a portion of the cutting block and the first shaft.

DESCRIPTION OF THE PREFERRED EMBODIMENT

Figure 11:
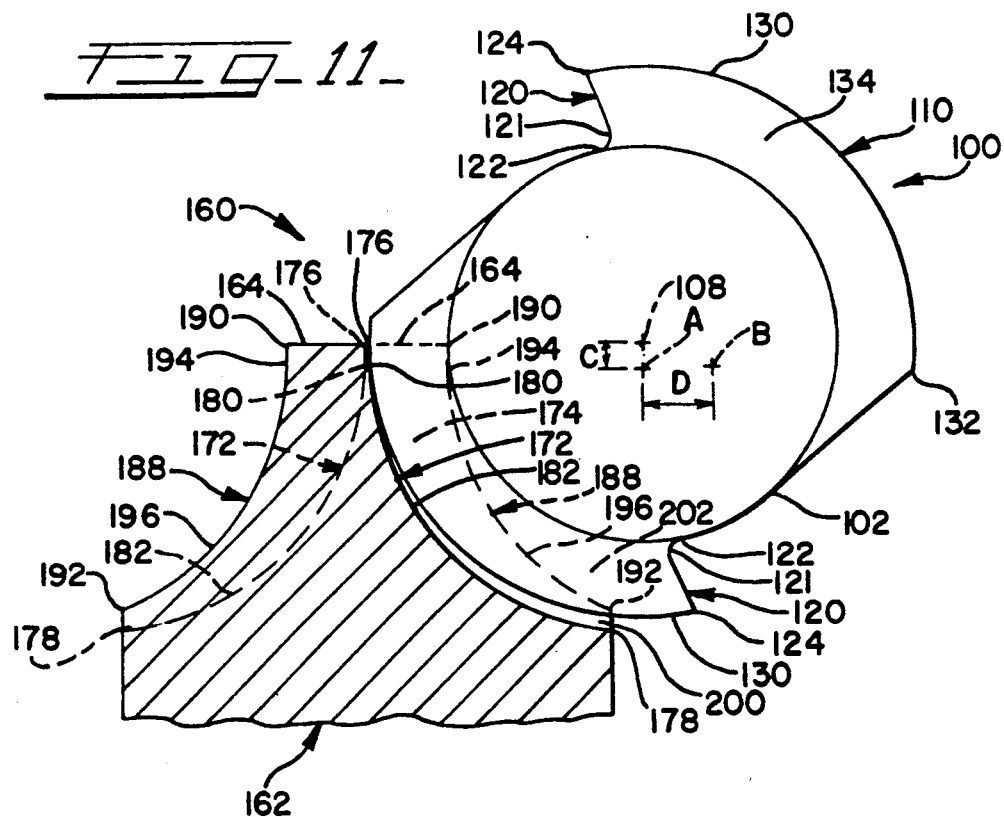
FIG. 11 is a partial cross sectional view of the second shaft and the cutting block of a second and preferred embodiment of the shredding machine.

FIG. 1 shows a shredding machine 10 and a vehicle tire 12 about to be shredded. The shredding machine 10 includes a frame 14 supported by legs 16. The frame 14 includes a side panel 18 and a side panel 20 which extend parallel and are spaced apart from one another. Each side panel 18 and 20 includes apertures 22, 24 and 26. A front panel 28 having threaded apertures 30 in each end is removably located between respective ends of the side panels 18 and 20. The front panel 28 is secured in place with fasteners 32 which extend through the apertures 22 and engage the threaded apertures 30 of the front panel 28. A center panel 34 extends between the side panel 18 and 20 and is fastened in position with fasteners 32 which extend through apertures 24. A rear panel 36 is removably fastened to the remaining ends of the side panels 18 and 20 by fasteners 32 which extend through apertures 26.

A shredder box 38 is formed by the side panels 18 and 20, the front panel 28 and the center panel 34. The shredder box 38 is open above and below. A gear box 40 is formed by the side panels 18 and 20, the center panel 34 and the rear panel 36. A cover plate 42 and a bottom plate (not shown) enclose the gear box 40.

The front panel 28 includes a first aperture 44, a second aperture 46 and a third aperture 48. The front panel 28 also includes a rotational bearing 50 and a rotational bearing 52. The center panel 34 also includes apertures 44, 46, and 48 and bearings 50 and 52.

As best shown in FIGS. 4 and 10, the cutting block 54 has end walls 56 and includes a top surface 58 which is composed of a series of rectangular plateaus 60 which are arranged in a checkerboard pattern along center line 62. The cutting block 54 also includes vertical walls 57 which extend along each side of the cutting block 54 between the end walls 56. Each plateau 60 is bound by four edges 64A-D. Edge 64A is located along the center line 62 and each edge 64D is located opposite an edge 64A. Edges 64B and 64C respectively extend between the ends of edges 64A and D.

A concave surface 66 extends between edge 64D of each plateau 60 and one of the vertical walls 57. Slots 68 extend from the top surface 58 to the vertical walls 57 between adjacent concave surfaces 66. Each slot 68 includes a back wall 70 which extends downwardly and outwardly from an edge 64A to a vertical wall 57. The back wall 70 includes an upper curved surface 72 and a lower curved surface 74 as best shown in FIG. 10. Each slot 68 also includes a side wall 76 which extends downwardly from an edge 64B and which extends between the back wall 70 and a concave surface 66. Each slot 68 also includes a side wall 78 which extends downwardly from an edge 64C and which extends between the back wall 70 and a concave surface 66. Each set of edges 64A-C which are formed between the top surface 58 and the slots 68 comprise a generally U-shaped cutting edge 80.

A mounting hub 82 extends from each end wall 56 of the cutting block 54. The mounting hub 82 is formed to fit within the aperture 48 of the front panel 28 and of the center panel 34 and to precisely hold the cutting block 54 in a stationary position. The cutting block 54 is machined from one piece of solid steel, preferably 8620 alloy steel. The cutting block 54 is then heat treated to a hardness of 55 to 58 Rockwell C.

FIG. 2 shows a first shaft 84 having a cylindrical surface 86 extending between a first end 88 and a second end 90. The first shaft 84 rotates about its longitudinal axis 92 in the direction of the arrow X, which is clockwise as shown in FIG. 2. A plurality of cutting teeth 94 extend from the cylindrical surface 86 of the shaft 84. A first set of cutting teeth 94A-J are spaced from one another along the longitudinal axis 92 of the shaft 84 and are spirally staggered to form a first spiral 85 around the cylindrical surface 86 of the shaft 84. FIG. 2 also shows a second spiral 87 of teeth 94A'-J'. As shown in FIG. 2, tooth 94A is aligned with tooth 94A' but located 180° apart. The same relationship exists between corresponding teeth of each spiral. While two spirals of teeth 85 and 87 are shown in FIG. 2, only one spiral of teeth may be used, or additional spirals of teeth may be used as desired.

FIG. 2 shows each spiral 85 and 87 completing one revolution around the cylindrical surface 86. However, each spiral of teeth 85 and 87 may make less than, or more than, a complete revolution around the shaft 84 as desired. It is preferred that each tooth 94 within each spiral 85 and 87 be staggered from its adjacent tooth an equal amount throughout each spiral 85 and 87. The longitudinal spacing between adjacent teeth 94 in each spiral 85 and 87 conforms to the spacing of the slots 68 in the cutting block 54.

The first shaft 84 also includes a pair of hubs 96 which respectively extend from the first end 88 and the second end 90. The hubs 96 of the first shaft 84 are respectively mounted in the bearings 50 in the front panel 28 and the center panel 34, allowing the shaft 84 to precisely rotate about its longitudinal axis 92. The shaft 84 also includes a drive shaft 98 which extends into the gear box 40. The drive shaft 98 is connected to the gearing within the gear box 40.

As shown in FIG. 3, the second shaft 100 includes a cylindrical surface 102 which extends between a first end 104 and a second end 106 of the second shaft 100. The second shaft 100 rotates about its longitudinal axis 108 in the direction of the arrow Y, which is counter-clockwise as shown in FIG. 3 and which is in the opposite direction relative to the first shaft 84. The second shaft 100 includes a plurality of cutting teeth 110. A first spiral 112 of cutting teeth 110A-J extends between the first end 104 and the second end 106 of the shaft 100. A second spiral 114 including cutting teeth 110A'-J' also extends between the first end 104 and the second end 106 of the shaft 100. Each tooth 110A'-J' is aligned with a respective tooth 110A-J about the circumference of the cylindrical surface 102. The number of spirals of teeth 110 and the arrangement of those spirals and their teeth may be varied as with the first shaft 84.

The second shaft 100 also includes a pair of hubs 116 at each respective end 104 and 106. Each hub 116 is respectively mounted in a bearing 52 within the front panel 28 and the center panel 34, allowing the second shaft 100 to precisely rotate about its longitudinal axis 108. A drive shaft 118 extends from the second end 106 into the gear box 40 and is attached to the gearing within the gear box 40.

As best shown in FIGS. 7, 8 and 10, each tooth 94 and 110 includes a planar tooth face 120 which extends from a line 122 which is formed between the tooth face 120 and the cylindrical surface 86 or 102. It is preferred, as shown in FIG. 11, for the tooth face 120 to include a curved fillet 121 which extends between the planar portion of the tooth face 120 and the cylindrical surface 86 or 102. The tooth face 120 is angled at approximately 15° from a line 123 which extends through the longitudinal axis 92 or 108 and the line 122, however, any angle between 0° and 15° may be used. The tooth face 120 is rectangular and preferably has a height which is approximately one and one-half times its width. The tooth face 120 is bound by the line 122, a tooth tip 124 which is opposite the line 122, and edges 126 and 128 which extend between the tooth tip 124 and the line 122 at their respective ends. The tooth tip 124 and the edges 126 and 128 comprise a second U-shaped cutting edge 129.

Each tooth 94 and 110 includes a convex surface 130 which extends between the tip 124 and an edge 132. The convex surface 130 is located at a constant radius from the longitudinal axis 92 or 108. Each convex surface 130 preferably extends approximately one-quarter of the distance around the circumference of shaft 84 or 100. A tooth wall 134 extends from each tooth edge 126 and 128 between the cylindrical surfaces 86 or 102 and the convex surface 130. The tooth walls 134 are perpendicular to the longitudinal axis 92 and 108 of the shafts 84 and 100. Each of the shafts 84 and 100, including their respective teeth 94 and 110, are machined from a single piece of steel. The shafts 84 and 100 and the teeth 94 and 110 are preferably made of 8620 alloy steel which is heat treated to a hardness of 55 to 58 Rockwell C.

As shown in FIGS. 5 and 6 a cleaning bar 136 is located adjacent each shaft 84 and 100 on the opposite side of the cutting block 54. Each cleaning bar 136 includes a cylindrical surface 138 and a plurality of ribs 140 extending perpendicularly from the cylindrical surface 138. The ribs 140 are spaced apart from one another so that the teeth 94 and 110 may pass between the ribs 140 as the teeth are rotated. As shown in FIG. 5, each rib 140 includes a horizontal surface 142 and a vertical surface 144. Each cleaning bar 136 also includes a hub 146 at each end of the cleaning bar 136. The hubs 146 are sized to fit precisely within the apertures 44 and 46 of the front panel 28 and the center panel 34. The cleaning bars 136 are also preferably made of 8620 alloy steel, however the cleaning bars 136 are not heat treated.

As best shown in FIGS. 7 and 8, the concave surfaces 66 on each side of the cutting block 54 conform to an arc of a circle having its origin located along longitudinal axis 92 or 108. The radius from the longitudinal axis 92 or 108 to the concave surfaces 66 is approximately 0.001 inches larger than the radius from the longitudinal axis 92 or 108 to the cylindrical surfaces 86 or 102.

The upper curved surface 72 of each slot 68 also conforms to an arc of a circle having its origin located along the longitudinal axis 92 or 108. The radius from the longitudinal axis 92 or 108 to the upper curved surface 72 is approximately 0.001 inches larger than the radius from the longitudinal axis 92 or 108 to the convex surfaces 130 and the tips 124 of the cutting teeth 94 and 110. The distance between the longitudinal axis 92 and 108 to the lower curved surface 74 of each slot 68 starts at a distance equal to the radius of the upper curved surface 72 and continually increases as the lower curved surface 74 extends downwardly to a vertical wall 57. The lower curved surface 74 provides a relief which allows a shredded piece of material to fall away from the cutting tooth 94 or 110 as it passes through a slot 68.

Each of the tooth walls 134 and their respective cutting edges 126 and 128 are located so as to have approximately 0.001 inches of clearance with the side walls 76 and 78 of the slots 68. The one-piece construction of the shafts 84 and 100 and their respective cutting teeth 94 and 110, and of the cutting block 54, enable the shredding machine 10 to operate with and maintain close tolerances. The one-piece construction also provides additional strength to the shredding machine 10.

As best shown in FIG. 6, motor 148 operates to turn a shaft 150 which is connected to the gearing within the gear box 40. The motor 148 may additionally include a gear reducer. The gearing within the gear box 40 is of a conventional and well known type and is used to rotate the shafts 84 and 100 in opposite directions relative to one another at equal rotational speeds. Various types and sizes of motors 148 and gearing may be used as desired depending upon the size of the shredding machine 10 and upon the types of material to be shredded.

As shown in FIG. 9 a control panel 152 may be provided to operate the motor 148 which drives the gearing in the gear box 40 and the shafts 84 and 100 in the shredder box 38. The control panel 152 is used to start and stop the motor 148 and is used to automatically shut off the shredding machine 10 when an overload condition is encountered, such as if a large metal bar should enter the shredding machine 10 which cannot be cut by the teeth 94 or 110. When an overload condition is encountered, the control panel 152 will automatically reverse the rotation of the shafts 84 and 100 a short distance to release the material causing the overload, and will then turn off the shredding machine 10.

The shredding machine 10 shown and described herein includes ten teeth 94 or 110 in each spiral 85, 87, 112 and 114. When used for shredding vehicle tires 12, the preferred shredding machine 10 will include twenty teeth 94 or 110 in each spiral, with each tooth 94 and 110 being approximately one inch wide and one and one-half inches high. The shafts 84 and 100 will have cylindrical surfaces 86 and 102 which are approximately twelve inches in diameter.

In operation, when materials such as vehicle tires 12 are to be shredded or comminuted, the vehicle tires 12 are fed into the shredding machine 10 from above the cutting block 54. As a tire 12 approaches the cutting block 54, the tip 124 of one or more of the cutting teeth 94 and 110 on each shaft 84 and 100 will puncture the surface of the tire 12 at a point above the top surface 58 of the cutting block 54. As the shafts 84 and 100 continue to rotate, additional teeth 94 and 110 will puncture the tire 12 due to the spiral arrangement of the teeth 94 and 110. The rotation of the shafts 84 and 100 will pull the tire 12 down to the top surface 58 of the cutting block 54.

If a tip 124 of a tooth 94 or 110 has not completely penetrated through the tire material when it grips the tire above the cutting block 54, a portion of the tire 12 will then become cut or sheared between the tip 124 of the cutting tooth 94 or 110 and the edge 64A of the slot 68 in the cutting block 54. As the shafts 84 and 100 continue to rotate, the side edges 126 and 128 of the cutting teeth 94 and 110 will cut the tire material 12 in cooperation with the edges 64B and 64C of side walls 76 and 78 of the slots 68. Each tooth 94 and 110 will comminute a portion of the tire 12 into a relatively uniformly sized pellet. Due to the staggered and spirally arranged tooth pattern on each shaft 84 and 100, the tire 12 is continuously being pulled down to the cutting block 54 by each shaft 84 and 100 for shredding. The cutting, shearing and puncturing action of each tooth 94 and 110 during the shredding process, prevents the material from being torn and allows the material to be comminuted into relatively uniformly sized pellets with few large pieces, and also prevents the shredding machine 10 from binding or jamming.

A tooth 94 or 110 will have completed the shredding of a pellet from the tire 12 when the tooth edges 126 and 128 have passed below the cutting edge 80 of its respective slot 68. As the tooth face 120 reaches the lower curved surface 74, the shredded pellet will begin to fall away from the tooth 94 or 110 and out the bottom of the shredder box 38. However, should any shredded material cling to a tooth 94 or 110, this material will be cleaned from the tooth 94 or 110 as the tooth passes the horizontal surfaces 142 of the cleaning bars 136.

The spirally staggered arrangement of the cutting teeth 94 and 110 on each shaft 84 and 100 also provides the advantage of having a limited number of teeth 94 and 110 performing the same operation at the same time. This reduces the power requirements of the shredding machine 10 as only a few of the teeth 94 and 110 are performing the pulling and cutting operations at any one time.

The length of the cutting block 54 and the shafts 84 and 100 may be varied depending on the size of the material to be shredded. The size of the cutting teeth 94 and 110 and their respective slots 68 may also be varied depending on the type of material to be shredded and upon the desired size to which the material is to be reduced. Many materials other than tires, which include metal, wood, plastic or glass may be shredded. The shredding machine 10 can shred tire rims, however, the shredding machine 10 is not intended for the shredding of large metal bars.

The shafts 84 and 100, the teeth 94 and 110, and the cutting block 54 are all heat treated to provide a hardened surface which will prevent chipping and scarring of the cutting edges 80 and the teeth 94 and 110 from materials such as steel belted tires 12 which contain steel wires. However, should the teeth 94 or 110 require sharpening, they may be sharpened with conventional equipment without removing the shafts 84 or 100 from the frame 14. The length of the convex surface 130 on each tooth 94 and 110 provides sufficient material so that each tooth 94 and 110 may be sharpened many times if desired. Should the cutting edges 80 become chipped or rounded over, the top surface 58 of the cutting block 54 may be ground down to provide a new set of cutting edges 80. The top surface 58 of the cutting block 54 may be ground down to the end of the upper curved surface 72 of the backwall 70. The shredding machine 10 is believed to be capable of shredding over 500,000 tires or similar material with proper maintenance and sharpening before the cutting shafts 84 and 100 will require replacement.

Material to be shredded may be loaded into the shredding machine 10 from a chute or hopper (not shown) located above the shredding box 38. A conveyor or a container may be located beneath the shredding box 38 to collect the shredded material. More than one shredding machine 10 may be used in series with other shredding machines 10. For example, a second machine 10 having fewer and smaller teeth 94 and 110 could be located directly below the first machine 10, or could be connected by conveyors or chutes, to provide a second and finer shredding of the material.

The shredding machine 10 is of a size and weight enabling it to be loaded and transported by truck to various sites such as tire dumps. This enables material to be shredded on site and allows the material to be shipped in as few loads as possible.

Figure 12:
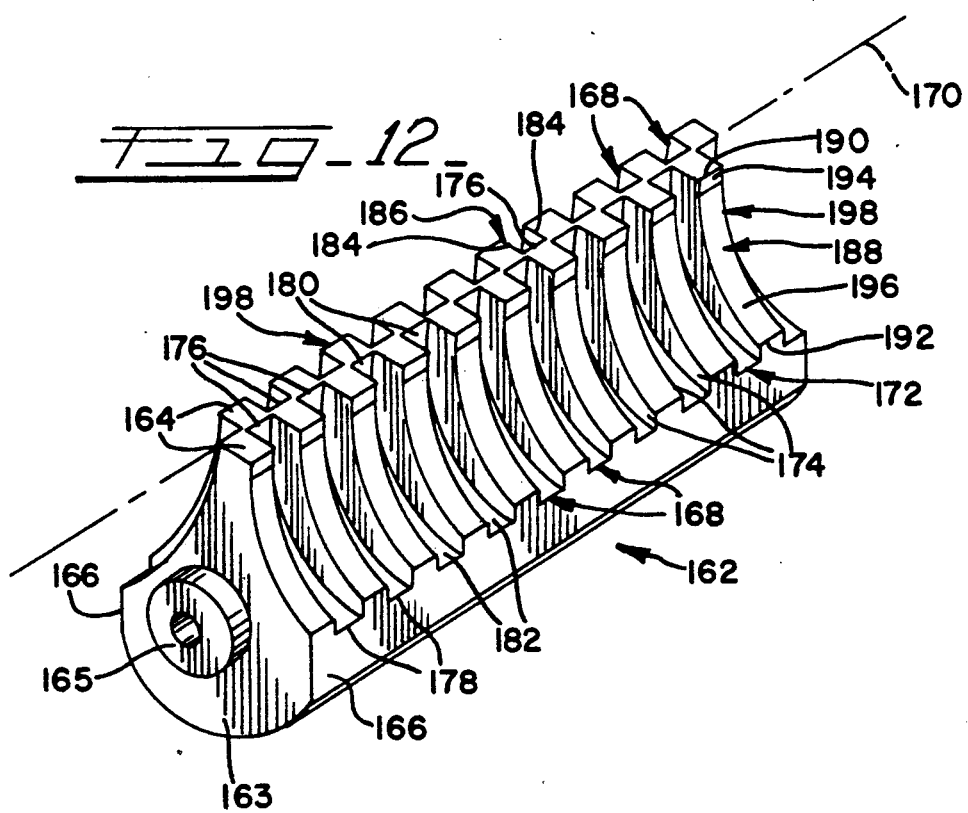
FIG. 12 is a perspective view of the cutting block of the second embodiment of the shredding machine.

A second and preferred embodiment of the shredding machine of the present invention is shown in part in FIGS. 11 and 12 and is designated with the number 160. The shredding machine 160 includes the same frame 14, shafts 84 and 100 and other elements as does the shredding machine 10, except the shredding machine 160 includes a cutting block 162 which differs from the cutting block 54 used in the shredding machine 10.

The cutting block 162 extends between two end walls 163 each of which includes a mounting hub 165 as does the cutting block 54. The cutting block 162 also includes a top surface 164 and vertical walls 166 which extend along the cutting block 162 between the end walls 163. The cutting block 162 also includes a plurality of slots 168 which extend downwardly and outwardly from the top surface 164 to a vertical wall 166. The slots 168 are located in two rows in an alternating checkerboard type pattern along each side of a center line 170. Each slot 168 includes a backwall 172 and a pair of side walls 174. Each backwall 172 forms an edge 176 with the top surface 164 and extends downwardly and outwardly to a vertical wall 164 where the backwall 172 forms an edge 178. The backwall 172 includes a planar wall portion 180 which extends vertically downward from the edge 176 and a curved wall portion 182 which extends from the planar wall portion 180 to the edge 178. The sidewalls 174 are perpendicular to the top surface 164 and form an edge 184 therewith. The edges 184 extend perpendicularly from each end of an edge 176. Each set of edges 176 and 184 which are formed by a respective slot 168 comprise a generally U-shaped cutting edge 186. Each edge 176 is preferably located approximately 0.003 inches from the center line 170. Each edge 184 of a generally U-shaped cutting edge 186 located on one side of the centerline 170 is preferably axially aligned with an edge 184 of a generally U-shaped cutting edge 186 located on the opposite side of the centerline 170.

The cutting block 162 also includes a plurality of concave surfaces 188 which are located between the sidewalls 74 of adjacent slots 168. The concave surfaces 188 extend from the top surface 164 to a vertical wall 166. Each concave surface 188 extends from an upper edge 190 at the top surface 164 downwardly and outwardly to a lower edge 192 at the vertical wall 164. Each concave surface 188 includes a planar surface portion 194 which extends vertically downward from the upper edge 190 and a curved surface portion 196 which extends downwardly and outwardly from the planar surface portion 194 to the lower edge 192. Each concave surface 188 and the adjoining sidewalls 174 form a rib 198. The ribs 198 are located in two rows along each side of the centerline 170 in an alternating checkerboard pattern such that each rib 198 on one side of the centerline 170 is located opposite a slot 168 on the other side of the centerline 170.

As shown in FIG. 11, the curved wall portions 182 of the backwalls 172 conform to an arc of a circle having its origin located along an axis A which is parallel to, and located a distance C vertically below, the longitudinal axis 92 or 108. The distance C is preferably approximately 0.25 inches below the axis 92 or 108. The radius from the longitudinal axis 92 or 108 to the edge 176 of the cutting edge 186 is approximately 0.002 to 0.005 inches larger than the radius from the longitudinal axis 92 or 108 to the convex surfaces 130 and tips 124 of the cutting teeth 94 and 110. There is a gap of approximately 0.002 to 0.004 inches between the edges 184 and the cutting teeth 94 and 110. As can be seen in FIG. 11, the distance between the curved wall portion 182 and the convex surface 130 of the cutting teeth 94 and 110 increases as the curved wall portion 182 extends downwardly and outwardly from the planar wall portion 180. Each curved wall portion 182 thereby provides a relief 200 between the curved wall portion 182 and the teeth 94 and 110 which allows a shredded piece of material to fall away from the cutting tooth 94 or 110 as it passes through a slot 168.

Also as shown in FIG. 11, the curved surface portions 196 of the concave surfaces 188 conform to an arc of a circle having its origin located along an axis B which is parallel to, and located a distance C vertically below the longitudinal axis 92 or 108 and a distance D horizontally from the longitudinal axis 92 or 108. The distance C is preferably 0.25 inches and the distance D is preferably equal to the length of the edges 184. The radius from the longitudinal axis 92 or 108 to the edge 190 of the concave surface 188 is approximately 0.010 to 0.015 inches larger than the radius from the longitudinal axis 92 or 108 to the cylindrical surfaces 86 or 102 of the shafts 84 and 100. The cylindrical surfaces 86 and 102 of the shafts 84 and 100 form a fourth side to the generally U-shaped cutting edges 186 such that a generally rectangular opening is formed in the top surface 164 of the cutting block 162 at the upper end of each slot 168. The cutting teeth 94 and 110 fit precisely within the rectangular openings formed by the cutting edges 186 and the cylindrical surfaces 86 and 102.

As can be seen from FIG. 11, the distance between the curved surface portions 196 and the cylindrical surfaces 86 or 102 increases as the curved surface portion 196 extends downwardly and outwardly from the planar surface portion 194. The curved surface portions 196 thereby provide reliefs 202 between the curved surface portions 196 and the cylindrical surfaces 86 or 102 which decrease the amount of surface contact, and the magnitude of frictional forces, between a shredded piece of material and the sidewalls 174 as the shredded piece of material passes through a slot 68. The reliefs 200 and 202 reduce the amount of force that is required to push a shredded piece of material through a slot 168 and thereby reduce the operating stresses in the cutting block 162 and in the shafts 84 and 100.

The alternating checkerboard pattern of the slots 168 allows the teeth 94 and 110 to pull all of the material to be shredded through the cutting block 162 without leaving any unshredded material on the top surface 164 of the cutting block 162. The downwardly and outwardly extending backwalls 172 of the slots 168 allow the cutting block 162 to have a large cross-sectional area thereby strengthening the cutting block 162 and decreasing the operating stresses in the cutting block 162. The cutting block 162 is machined from one piece of solid steel, preferably 8620 alloy steel, and is preferably heat treated to a hardness of approximately 55-58 Rockwell C. The top surface 164 of the cutting block 162 may be ground down to provide a new set of U-shaped cutting edges 186. The overall operation of the shredding machine 160 is substantially the same as the operation of the shredding machine 10 but, as previously described, requires reduced force for operation.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A shredding machine for shredding various materials including:
    a frame;
    a stationary cutting block mounted on said frame, said cutting block including a top surface and a plurality of slots extending downwardly from said top surface, said slots being located in an alternating pattern along each side of a centerline, each said slot including a downwardly and outwardly extending backwall, said top surface and each said slot defining a respective generally U-shaped cutting edge;
    a first shaft rotatably mounted on said frame, said first shaft including a plurality of cutting teeth adapted and positioned to pass through a corresponding slot in said cutting block;
    a second shaft rotatably mounted on said frame, said first shaft and said second shaft being mounted on opposite sides of said cutting block, said second shaft including a plurality of cutting teeth adapted and positioned to pass through a corresponding slot in said cutting block; and
    means for rotating said first and second shafts in opposite directions relative to one another such that said cutting teeth grip the material to be shredded and pass through each respective slot, thereby comminuting said material.

2. The shredding machine of claim 1 wherein said cutting block additionally includes a plurality of concave surfaces one such surface located between each said slot.

3. The shredding machine of claim 2 wherein said backwall of each said slot forms a relief with a corresponding cutting tooth and each said concave surface forms a relief with one of said shafts.

4. The shredding machine of claim 1 wherein said cutting teeth are spaced along the length of each said shaft.

5. The shredding machine of claim 4 wherein said cutting teeth are spirally arranged around the circumference of each said shaft.

6. The shredding machine of claim 1 wherein each said shaft and the respective cutting teeth of each said shaft are integrally formed from a single piece of steel.

7. The shredding machine of claim 1 wherein said cutting block is integrally formed from a single piece of steel.

8. The shredding machine of claim 1 additionally including cleaning means for removing shredded material from said teeth, said cleaning means being mounted on said frame and located adjacent each said shaft on the side opposite said cutting block.

9. The shredding machine of claim 8 wherein said cleaning means includes a cylindrical surface and a plurality of ribs extending from said surface, said ribs being spaced apart from one another such that said teeth pass between said ribs.

10. The shredding machine of claim 9 wherein each said rib includes a horizontal cleaning surface.

11. A shredding machine for shredding various materials including:
    a frame;
    a stationary cutting block mounted on said frame, said cutting block including a top surface and a plurality of slots extending downwardly from said top surface, said slots being located on at least one side of said cutting block, each said slot including a downwardly and outwardly extending backwall, said block additionally including a plurality of concave surfaces located between said slots, said top surface and each said slot defining a respective generally U-shaped cutting edge;

a shaft rotatably mounted on said frame, said shaft including a cylindrical surface and a plurality of cutting teeth extending from said surface, said cutting teeth adapted and positioned to pass through a corresponding slot in said cutting block; and means for rotating said first shaft such that said cutting teeth grip the material to be shredded and pass through each respective slot, thereby comminuting said material.

12. The shredding machine of claim 11 wherein said backwall of each said slot forms a relief with a corresponding cutting tooth and each said concave surface forms a relief with said cylindrical surface of said shaft.

13. The shredding machine of claim 11 additionally including cleaning means for removing shredded material from said teeth, said cleaning means being mounted on said frame and located adjacent said shaft on the side opposite said cutting block.

14. The shredding machine of claim 13 wherein said cleaning means includes a cylindrical surface and a plurality of ribs extending from said surface, said ribs being spaced apart from one another such that said teeth pass between said ribs.

15. The shredding machine of claim 14 wherein each said rib includes a horizontal cleaning surface.

* * * * *